(12) United States Patent
Imagawa

(10) Patent No.: US 12,361,592 B2
(45) Date of Patent: Jul. 15, 2025

(54) RANGING SENSOR CALIBRATION SYSTEM AND RANGING SENSOR CALIBRATION METHOD

(71) Applicant: Hitachi, Ltd., Tokyo (JP)

(72) Inventor: Seiji Imagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 418 days.

(21) Appl. No.: 17/796,161

(22) PCT Filed: Dec. 22, 2020

(86) PCT No.: PCT/JP2020/047794
§ 371 (c)(1),
(2) Date: Jul. 28, 2022

(87) PCT Pub. No.: WO2021/171758
PCT Pub. Date: Sep. 2, 2021

(65) Prior Publication Data
US 2023/0103773 A1    Apr. 6, 2023

(30) Foreign Application Priority Data
Feb. 27, 2020  (JP) .................................. 2020-031771

(51) Int. Cl.
*G06T 7/80*    (2017.01)
*G01C 25/00*   (2006.01)
(Continued)

(52) U.S. Cl.
CPC ................ *G06T 7/85* (2017.01); *G01C 25/00* (2013.01); *G01S 11/12* (2013.01); *G06T 7/521* (2017.01);
(Continued)

(58) Field of Classification Search
CPC .................... G01C 25/00; G01C 3/085; G06T 2207/10012; G06T 2207/10028;
(Continued)

(56) References Cited

U.S. PATENT DOCUMENTS 11,454,514 B2 *   9/2022   Niihara .................. G01C 21/20
2006/0072914 A1   4/2006   Arai et al.
(Continued)

FOREIGN PATENT DOCUMENTS

EP   3 358 364 A1    8/2018
JP   10-341458 A    12/1998
(Continued)

OTHER PUBLICATIONS

International Search Report (PCT/ISA/210) issued in PCT Application No. PCT/JP2020/047794 dated Mar. 23, 2021 with English translation (four (4) pages).
(Continued)

*Primary Examiner* — Lisa M Caputo
*Assistant Examiner* — Joshua L Forristall
(74) *Attorney, Agent, or Firm* — Crowell & Moring LLP

(57) ABSTRACT

Provided is a ranging sensor calibration system that can execute a calibration operation during travel at low cost and without adding a special configuration. This ranging sensor calibration system is provided with a plurality of ranging sensors that are installed facing at least a first direction along a direction of travel of a vehicle and a second direction that is an opposite direction to the first direction, and are configured to be able to measure a distance; and a calibration processing unit that configures the plurality of ranging sensors. The calibration processing unit is configured to calibrate the plurality of ranging sensors on the basis of a distance between a plurality of calibration targets disposed near a travel path for the vehicle, a distance between the plurality of ranging sensors, and a distance measured by each of the plurality of ranging sensors.

15 Claims, 9 Drawing Sheets

(51) Int. Cl.
*G01S 5/16* (2006.01)
*G01S 11/12* (2006.01)
*G06T 7/521* (2017.01)

(52) U.S. Cl.
CPC ....... *G01S 5/16* (2013.01); *G06T 2207/10012* (2013.01); *G06T 2207/10028* (2013.01); *G06T 2207/30252* (2013.01)

(58) Field of Classification Search
CPC .......... G06T 2207/30252; G06T 7/521; G06T 7/85; G01S 11/12; G01S 5/16
USPC .......................................................... 702/97
See application file for complete search history.

(56) References Cited

U.S. PATENT DOCUMENTS

| | | |
|---|---|---|
| 2012/0224069 A1 | 9/2012 | Aoki |
| 2013/0250068 A1 | 9/2013 | Aoki |
| 2015/0002638 A1 | 1/2015 | Suzuki et al. |
| 2018/0300898 A1 | 10/2018 | Eshima et al. |
| 2019/0285432 A1 | 9/2019 | Sakaguchi et al. |
| 2020/0320728 A1* | 10/2020 | Tsunashima ........... G01C 11/14 |
| 2021/0134079 A1* | 5/2021 | Nee ........................ B65G 47/80 |

FOREIGN PATENT DOCUMENTS

| | | |
|---|---|---|
| JP | 2005-77130 A | 3/2005 |
| JP | 2009-294109 A | 12/2009 |
| JP | 2012-58188 A | 3/2012 |
| JP | 6620869 B2 | 12/2019 |
| JP | 2020-113908 A | 7/2020 |
| WO | WO 2017/209015 A1 | 12/2017 |
| WO | WO 2018/173907 | 9/2018 |

OTHER PUBLICATIONS

Japanese-language Written Opinion (PCT/ISA/237) issued in PCT Application No. PCT/JP2020/047794 dated Mar. 23, 2021 (four (4) pages).
Australian Office Action issued in Australian Application No. 2020431041 dated Aug. 24, 2023 (6 pages).

* cited by examiner

RANGING SENSOR CALIBRATION SYSTEM AND RANGING SENSOR CALIBRATION METHOD

TECHNICAL FIELD

The present invention pertains to a ranging sensor calibration system that is mounted in a vehicle and measures the distance between the vehicle and an object, and a calibration method.

BACKGROUND ART

A ranging system that uses a ranging sensor such as a stereo camera to calculate the distance between a vehicle such as an automobile or a train and another object is known through Patent Document 1, for example. This Patent Document 1 discloses a system that, in addition to the stereo camera, is mounted with an active rangefinder (ARF) that measures a distance using light projection. Specifically, using outgoing light from the ARF as auxiliary light for the stereo camera, and using a ranging result by the ARF to correct a ranging result by the stereo camera are disclosed.

In the ranging system, accurately measuring the distance to an object is required. However, in a ranging sensor that measures the distance to an object, measurement error arises in conjunction with change over time or change in the environment (temperature, humidity, barometric pressure, etc.). Accordingly, it is necessary to periodically detect a measurement error in a ranging sensor, and calibrate the ranging sensor.

As in Patent Document 1, it is possible to separately provide separate ranging means (such as an ARF) which is capable of high-accuracy ranging and, on the basis of a ranging result from the high-accuracy ranging means, calibrate the ranging sensor (such as a stereo camera) which is to be calibrated. However, providing separate ranging means for calibration leads to a cost increase. In addition, it is possible that measurable distances will not match between high-accuracy ranging means and ranging means to be calibrated. For example, a maximum ranging range for an ARF is typically shorter than a maximum ranging range for a stereo camera. Accordingly, there is the problem in that a stereo camera which is to be calibrated cannot be calibrated over the entire ranging range.

In addition, in many conventionally known systems, it is difficult to perform a calibration operation while traveling. In a system for which calibration is possible only while stopped, not being able to perform calibration at appropriate timings after the frequency of executing calibration operations decreases and ranging sensor error in excess of a tolerance limit in the meantime can occur.

PRIOR ART DOCUMENT

Patent Document

Patent Document 1: JP-2005-77130-A

SUMMARY OF INVENTION

Problems to be Solved by the Invention

The present invention is made in the light of the above-mentioned problems, and an objective of the present invention is to provide a ranging sensor calibration system that can execute a calibration operation during travel at low cost and without adding a special configuration.

Means for Solving the Problems

In order to solve the problems described above, a ranging sensor calibration system according to the present invention is provided with: a plurality of ranging sensors that are installed facing at least a first direction along a direction of travel of a vehicle and a second direction that is an opposite direction to the first direction, and are configured to be able to measure a distance; and a calibration processing unit that configures the plurality of ranging sensors. The calibration processing unit is configured to calibrate the plurality of ranging sensors on the basis of a distance between a plurality of calibration targets disposed near a travel path for the vehicle, a distance between the plurality of ranging sensors, and a distance measured by each of the plurality of ranging sensors.

In addition, a ranging sensor calibration method according to the present invention includes: installing a plurality of ranging sensors facing at least a first direction along a direction of travel of a vehicle and a second direction that is an opposite direction to the first direction; using each of the plurality of ranging sensors to calculate distances to a plurality of calibration targets disposed near a travel path for the vehicle; and performing calibration of the plurality of ranging sensors on the basis of a distance between the plurality of calibration targets, a distance between the plurality of ranging sensors, and distances measured by each of the plurality of ranging sensors.

Advantages of the Invention

By virtue of the present invention, it is possible to provide a ranging sensor calibration system and a calibration method that enable execution of a calibration operation during travel at low cost and without using a special calibration apparatus.

MODES FOR CARRYING OUT THE INVENTION

Embodiments of the present embodiment are described below with reference to the attached drawings. In the attached drawings, there are cases where elements that are functionally the same are indicated by the same number. Note that, while the attached drawings illustrate embodiments and implementation examples in accordance with the principle of the present disclosure, the embodiments and implementation examples are provided to aid in understanding the present disclosure and should not be interpreted as limiting the present disclosure. The descriptions in the present specification are merely typical examples and are not meant to limit in any way the scope of the claims of the present disclosure or application examples thereof.

The present embodiments will be described in such sufficient detail as to enable a person skilled in the art to carry out the present disclosure, but it is necessary to understand that other implementations and modes are also possible, and that various modifications of configurations and structures and substitutions of various elements are possible without departing from the scope and spirit of the technical concepts of the present disclosure. Accordingly, the following descriptions are not to be interpreted as limiting.

First Embodiment

Figure 1:
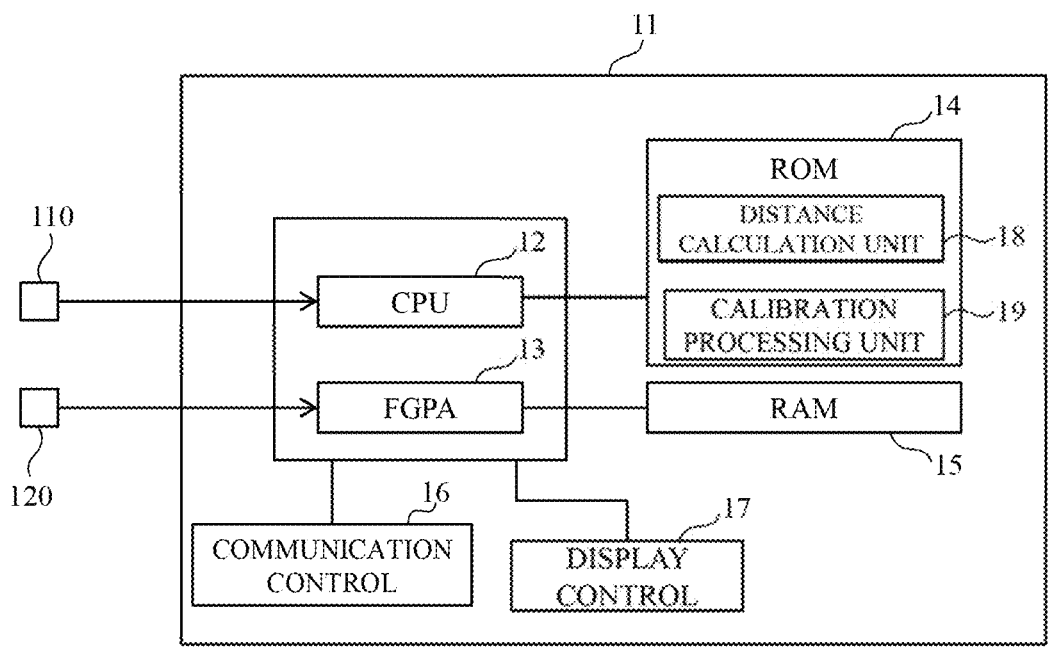
FIG. 1 is a block view that illustrates a configuration of a ranging sensor calibration system 11 according to a first embodiment.
Figure 2:
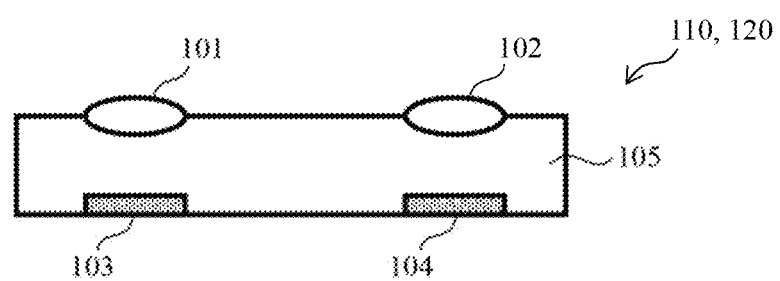
FIG. 2 is a schematic view that illustrates an example of a configuration of stereo cameras 110 and 120.
Figure 3:
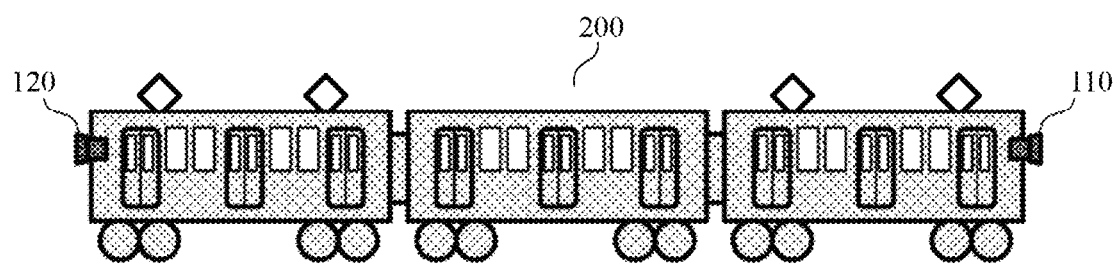
FIG. 3 illustrates an example of an approximate configuration of the stereo cameras 110 and 120.

With reference to FIG. 1 to FIG. 3, description is given for a ranging sensor calibration system according to a first embodiment. FIG. 1 is a block view that illustrates a configuration of a ranging sensor calibration system 11 according to the first embodiment. As described below, this calibration system 11 is mounted to a vehicle, for example a railroad vehicle. As an example of a ranging sensor as described below, a plurality of stereo cameras, for example two (110, 120), are mounted to the vehicle. The calibration system 11 calibrates these stereo cameras 110 and 120 and thus is mounted in the vehicle. In addition, one of the stereo cameras 110 and 120 is disposed to face the direction of travel of the vehicle, and the other is disposed to face a direction (for example, an opposite direction) that differs to the direction of travel of the vehicle. In other words, the plurality of stereo cameras are not all disposed to face the direction of travel, and at least one is disposed to face a direction (for example, an opposite direction) that differs to the direction of travel.

As a hardware configuration, the present calibration system 11 is provided with a CPU 12, an FPGA (Field Programmable Grid Array) 13, a ROM 14, a RAM 15, a communication control unit 16, and a display control unit 17, for example. The CPU 12 and the FPGA 13 are connected to the stereo cameras 110 and 120, and are configured to receive output signals from the stereo cameras 110 and 120 and be able to perform various arithmetic processing.

The ROM 14 stores a calibration program that defines operations by the present calibration system 11. This calibration program is executed, whereby a distance calculation unit 18 and a calibration processing unit 19 are realized. In addition, the RAM 15 stores a result of various calculations, and data necessary for other operations.

The communication control unit 16 is configured to be able to control transmission and reception of various data or commands to and from an external computer, for example. In addition, the display control unit 17 is configured to be able to control display of various items of information including a measurement result, in a display (not illustrated), for example.

FIG. 2 illustrates an example of an approximate configuration of the stereo cameras 110 and 120. The stereo cameras 110 and 120 are configured by being provided with, for example, lenses 101 and 102, image capturing elements 103 and 104 (for example, CCD cameras), and a housing 105. The stereo cameras 110 and 120 use the principles of trigonometry to measure the distance to a target object.

Specifically, the stereo cameras 110 and 120 obtain, as parallax, the difference between the position of pixels projected by the target object onto one of the image capturing elements 103 and 104 and the position of pixels projected onto the other of the image capturing elements 103 and 104, and calculate the distance to the target object on the basis of a baseline length, a focal length, and pixel pitch between left and right image capturing elements. For example, for an object at infinity, the position of an image projected onto left and right image capturing elements 103 and 104 is the same, and the parallax is 0. Accordingly, in a case where structural change that includes change in the environment (temperature, humidity, pressure, etc.), change over time of lens shapes, change in the relative positional relation between the lenses 101 and 102 and the image capturing elements 103 and 104, deviation in the optical axes of the lenses 101 and 102, baseline length deviation, etc. has arisen, this change impacts ranging results, and is a cause of measurement error.

FIG. 3 illustrates an overall image of a vehicle 200, including positions where the stereo cameras 110 and 120 are disposed. The stereo cameras 110 and 120 are respectively disposed at the frontmost portion and rearmost portion of the vehicle 200, and are together disposed so as to be able to capture an opposite direction, in relation to the direction of travel of the vehicle 200. The stereo cameras 110 and 120 are, for example, disposed with a distance Ls opened therebetween in the case where a train that constitutes the vehicle 200 is disposed following a straight line.

For example, there is a case where the vehicle 200 travels from right to left in FIG. 3, and a case where the vehicle 200 conversely travels from left to right in FIG. 3. In a case of traveling from right to left, the stereo camera 120, which is facing the direction of travel, measures the distance to a target object. Conversely, in a case of traveling from left to right, the stereo camera 110, which is facing the direction of travel, measures the distance to a target object.

Even in the case where the vehicle 200 travels in either of the left and right direction, a notification or a warning via a display unit (display) or a warning unit (not illustrated) or travel control (deceleration control or stop control) for the train is performed, in response to a ranging result from the stereo camera 110 or 120. Note that, because a stereo camera facing an opposite side to the direction of travel captures an image after the vehicle 200 has already passed by, information for preventing an accident for the vehicle 200 is not provided even if this stereo camera were operating. Accordingly, it is possible to turn off the power supply for a stereo camera that faces the opposite side to the direction of travel of the vehicle 200 (for example, the stereo camera 110 in the case of traveling from right to left in FIG. 3) in a normal state, or have the stereo camera enter a standby mode. However, in a case of performing a calibration operation described below, the stereo camera that faces the opposite side to the direction of travel has its power supply turned on or starts operation, and is able to provide distance information necessary for the calibration operation.

Figure 4:
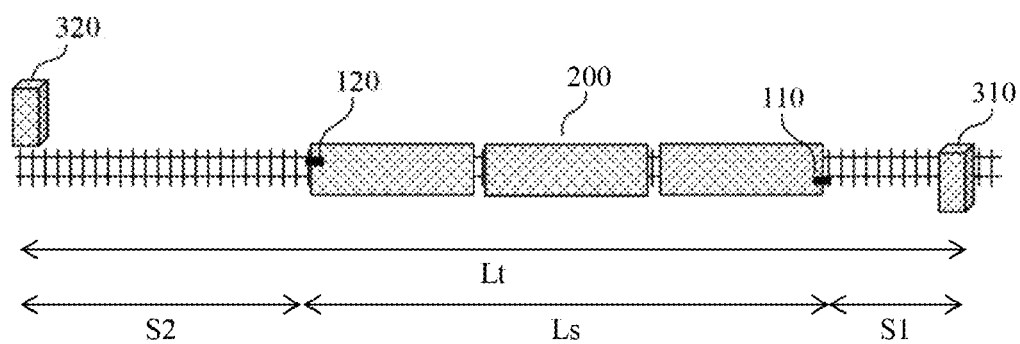
FIG. 4 is for describing operation by the calibration system 11 according to the first embodiment, together with calibration targets 310 and 320 that make up part of the same system.

With reference to FIG. 4, description is given for operation by the calibration system 11 according to the first embodiment, together with calibration targets 310 and 320 that make up a portion of the same system. This calibration system 11 is made to be able to use the calibration targets 310 and 320 to execute a calibration operation following the travel path (track) of the vehicle 200.

The calibration targets 310 and 320 are disposed with a known distance Lt opened therebetween, at positions along the travel path (track) of the vehicle 200. In the case where the travel path is a track, the calibration targets 310 and 320 can be disposed at positions close to the track, for example at positions separated several meters from the track. It may be that the distance Lt is measured in advance, and distance data therefor is, for example, stored in the ROM 14, etc. Note that the calibration targets 310 and 320 may be disposed at any position on the track, but from the perspective of performing measurement by the stereo cameras 110 and 120 with high accuracy and the perspective of performing a calibration operation with high accuracy, it is desirable for the calibration targets 310 and 320 to be disposed on a straight path that is sufficiently longer than the length of the vehicle 200.

With reference to FIG. 4, principles of a calibration operation in the calibration system according to the first embodiment will be described. It is assumed that the distance Lt between the calibration targets 310 and 320 is known, and furthermore that the distance Ls between the stereo cameras 110 and 120 is known. In this situation, it is assumed that a distance S1 from the stereo camera 110 to the calibration target 310 is measured by the stereo camera 110, and furthermore a distance S2 from the stereo camera 120 to the calibration target 320 is measured by the stereo camera 120.

At this time, if there is no measurement error for the distances S1 and S2, Lt=Ls+S1+S2 . . . (formula 1) is established. However, in practice the distances S1 and S2 include measurement error, and letting the total measurement error be Δ, the measurement error Δ becomes Δ=S2−(Lt−Ls−S1) . . . (formula 2).

The calibration system according to the first embodiment is configured to, on the basis of the measurement error Δ measured in accordance with this (formula 2), execute calibration of a stereo camera that has detected a farther distance, from among the stereo cameras 110 and 120. This point is described below with reference to FIG. 5 through FIG. 9.

Figure 5:
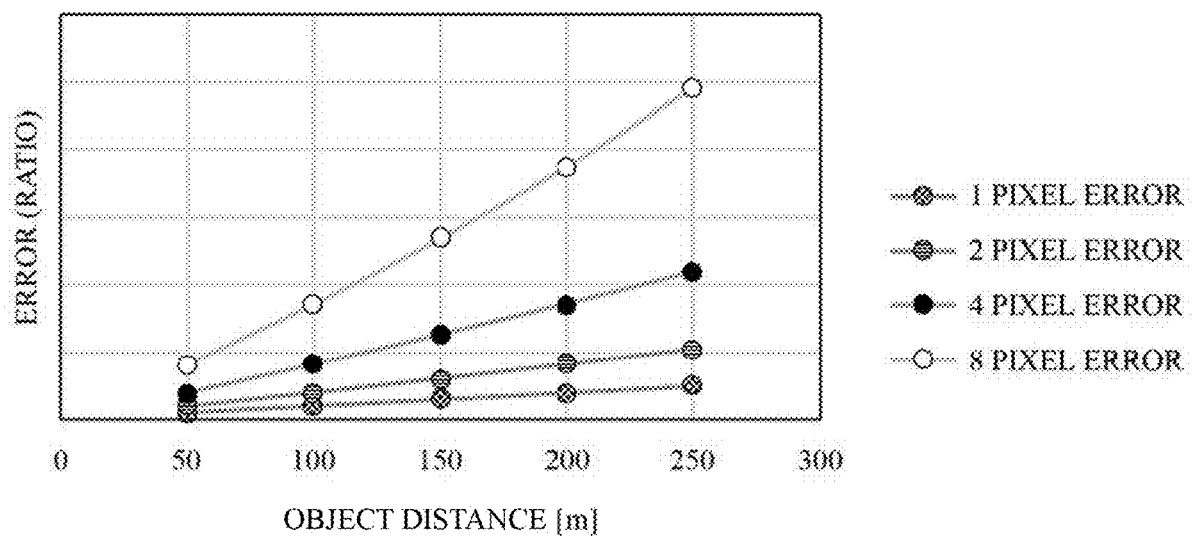
FIG. 5 is a graph for describing a relation between the distance to an object measured by a stereo camera, and error (an error ratio) for a measurement value thereof.
Figure 6:
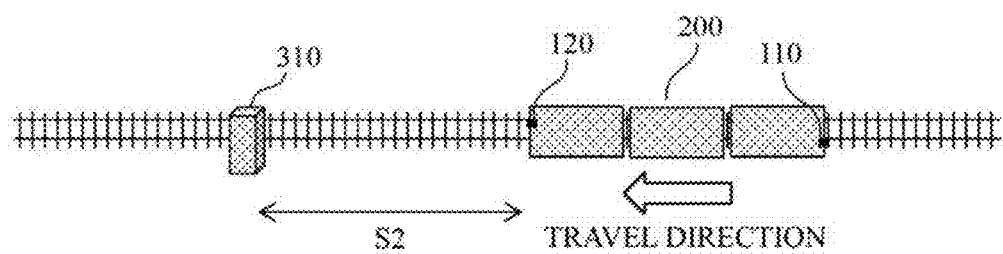
FIG. 6 is a schematic view for describing a procedure for executing a calibration operation in the calibration system according to the first embodiment.

FIG. 5 is a graph for describing a relation between the distance to an object measured by a stereo camera, and error (an error ratio) for a measurement value thereof. The greater the distance (measurement value) to an object, the greater the error. In addition, in a stereo camera, there are cases where there is deviation (pixel deviation) between the positions of the lenses 101 and 102 and the image capturing elements 103 and 104 due to the temperature, humidity, or change over time, but a constant offset error arises for parallax due to this pixel deviation, and an error (error ratio) for measured distance calculated from the parallax increases the greater the pixel deviation.

As illustrated in FIG. 5, the error is low in a case where the distance to an object is short. For example, if S1<S2 in the case where the stereo cameras 110 and 120 respectively measure the distances S1 and S2, it is considered that the measurement result by the stereo camera 110 (the distance S1) has less error in comparison to the stereo camera 120 (the distance S2). Accordingly, in the first embodiment, the measurement error Δ specified in accordance with the abovementioned (formula 2) is used to calibrate the stereo camera 120 that measured a longer distance.

With reference to the schematic views in FIG. 6 through FIG. 9 and the flow chart in FIG. 10, description is given below for a procedure for executing a calibration operation in the calibration system according to the first embodiment. In FIG. 6 through FIG. 9, it is assumed that the vehicle 200 is traveling from the right side to the left side of the paper surface.

When a calibration operation is started, the stereo camera 120 which is facing the direction of travel (forward) starts a ranging operation (step S11). The stereo camera 120 monitors forward (left direction on the paper surface) at a predetermined cycle. When the vehicle 200 continues to travel toward the left side, the vehicle 200 approaches the calibration target 310 (in FIG. 6, the calibration target 320 is further in the left direction from the calibration target 310, and is not illustrated). When the distance S2 between the calibration target 310 and the stereo camera 120 becomes less than or equal to a predetermined distance (for example, less than or equal to 50 m) (Yes in step S12), the power supply for the stereo camera 110 which is on the opposite side to the direction of travel and has been set to a power supply off state is turned on (on), and a measurement operation for a calibration operation is started (step S13). Note that, before the start of a calibration operation, the stereo camera 110 may have been set to a power saving mode, etc. instead of being put into a power supply off state. In addition, similarly to the stereo camera 120, the stereo camera 110 may be set to a state in which the power supply is made to be constantly on and consecutive image capturing is possible.

Figure 7:
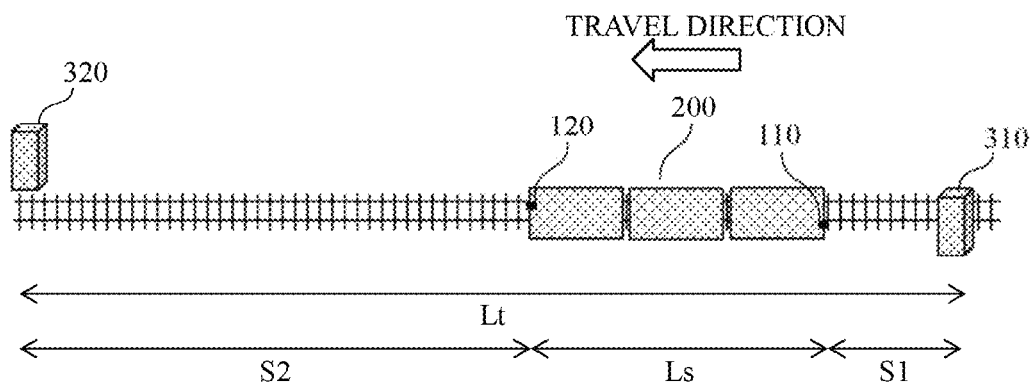
FIG. 7 is a schematic view for describing a procedure for executing a calibration operation in the calibration system according to the first embodiment.

As illustrated in FIG. 7, when the vehicle 200 moves between the calibration targets 310 and 320 (step S14), the CPU 12 transmits a synchronization signal to the stereo cameras 110 and 120. In accordance with this synchronization signal, the stereo cameras 110 and 120 approximately simultaneously (at approximately the same time) obtain images of the calibration targets 310 and 320, and approximately simultaneously measure the distances S1 and S2 (step S15). At what timing the stereo cameras 110 and 120 obtain the images is optional, but it is desirable for the stereo cameras 110 and 120 to approximately simultaneously obtain the images. As an example, it is possible to cause the CPU 12 to output a synchronization signal for obtaining images in a case where the distance S1 measured by the stereo camera 110 has become 50 m. Note that, if it is possible to acquire data pertaining to temporal relatedness between a measurement result from the stereo camera 110 and a measurement result from the stereo camera 120, the measurement timings for the stereo cameras 110 and 120 is not necessarily simultaneous, and may differ slightly.

The distances S1 and S2 are calculated by the distance calculation unit 18 on the basis of the images acquired by the stereo cameras 110 and 120. These distances S1 and S2 are then substituted into the abovementioned (formula 2) to thereby calculate the error Δ. A calibration operation for the stereo camera 120 is executed using this calculated error Δ. In other words, from among the stereo cameras 110 and 120, the stereo camera 120 which measured a longer distance is calibrated on the basis of the calculated error Δ (step S16).

Figure 8:
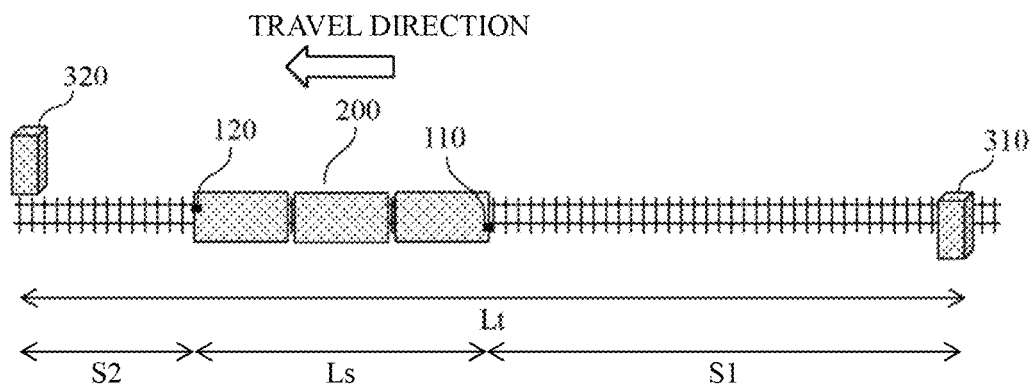
FIG. 8 is a schematic view for describing a procedure for executing a calibration operation in the calibration system according to the first embodiment.

From the state in FIG. 7, the vehicle further proceeds in the left direction and, as in FIG. 8, when the distance S2 from the stereo camera 120 to the calibration target 320 has become less than or equal to a predetermined value, for example less than or equal to 50 m (Yes in step S17), the CPU 12 again transmits a synchronization signal to the stereo cameras 110 and 120. In accordance with this synchronization signal, the stereo cameras 110 and 120 simultaneously obtain images of the calibration targets 310 and 320, and approximately simultaneously measure the distances S1 and S2 (step S18). The acquired S1 and S2 are substituted into (formula 2), and the error Δ is calculated again. At this time, because S1>S2, this error Δ is used to calibrate the stereo camera 110 which measured the long distance S1 (step S19).

Figure 9:
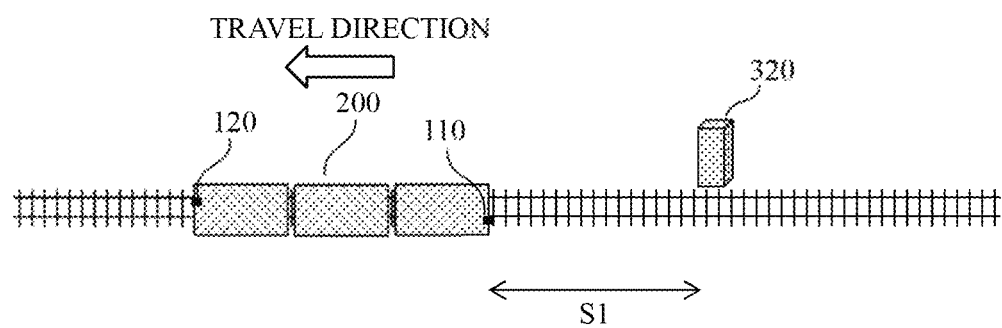
FIG. 9 is a schematic view for describing a procedure for executing a calibration operation in the calibration system according to the first embodiment.

When the vehicle 200 passes by the calibration target 320 (step S20), as illustrated in FIG. 9, the stereo camera 110, which is rearward with respect to the direction of travel, continues to measure the calibration target 320. When the distance S1 between the stereo camera 110 and the calibration target 320 has become greater than or equal to a predetermined value (for example, 50 m) (Yes in step S21), it is determined that the calibration operation has ended, the power supply of the stereo camera 110 is turned off, and the measurement operation stops. Due to the above, calibration operations for the stereo cameras 110 and 120 ends.

Note that it is necessary for the distance Lt between the calibration targets 310 and 320 to be determined in accordance with shortest measurable distances R1min and R2min and longest measurable distances R1max and R2max for the stereo cameras 110 and 120. This is because there is a need for both of the front and back stereo cameras 110 and 120 to measure the distance to the corresponding calibration targets 310 and 320. Specifically, it is necessary to set the distance Lt in order to satisfy the following (formula 3).

$$Ls+R1min+R2min<Lt<Ls+R1max+R2max \quad \text{(formula 3)}.$$

Note that, in the case where the shortest measurable distances and the longest measurable distances for the two stereo cameras 110 and 120 are equal to one another (R1min=R2min=Rmin, and R1max=R2max=Rmax), it is desirable to have the distance Lt be approximately equal to a value resulting from adding Rmax and Rmin to the distance Ls. In other words, it is desirable to set the distance Lt such that the following (formula 4) holds.

$$Lt \approx Ls+Rmax+Rmin \quad \text{(formula 4)}.$$

The calibration targets 310 and 320 may be targets that are specially set in order to perform a calibration operation according to the present embodiment, but it is also possible to employ a plurality of existing structures (for example, utility poles, signs, etc.) as the calibration targets 310 and 320 by measuring the distance therebetween in advance. Alternatively, an existing structure may be worked (for example, a target for the purpose of the present calibration operation may be attached to or drawn on an existing structure). In a case where an existing structure, etc. is made to be a calibration target, for example it is possible to execute a test run and use the stereo camera 110 or 120 to search for an object that would be suitable as a calibration target. As a calibration target, it is desirable to have an object for which an image is formed near the center of the image capturing elements in the stereo camera 110 or 120, and for which parallax can be stably acquired. Specifically, it is desirable to have, as a calibration target, an object for which a large amount of parallax can be acquired within a range for the object, and for which a variance value for the acquired parallax is low.

As described above, in the first embodiment, the calibration targets 310 and 320 for which the distance therebetween is known are captured by the stereo cameras 110 and 120 which are disposed at the front and rear of the vehicle 200, whereby calibration of the stereo camera 110 and/or 120 is performed. At this time, the procedure illustrated in FIG. 7 and FIG. 8 is executed and a calibration operation is performed in the light of that the measurement value (ranging value) from a stereo camera for which the distance to a calibration target is closer has less error than the measurement value from the stereo camera for which the distance to the calibration target is longer. By virtue of the first embodiment, it is possible to execute calibration with only the stereo cameras 110 and 120, and separate ranging means is not necessary. In other words, by virtue of the present embodiment, it is possible to provide a ranging sensor calibration system and a calibration method that enable execution of a calibration operation during travel at low cost and without using a special apparatus. Note that a calibration operation according to the present embodiment can also be performed while the vehicle 200 is traveling normally (during high-speed travel), but can also be performed during low-speed travel or while stopped. In addition, without being limited to a travel path for a vehicle, it is also possible to install an equivalent calibration target in a vehicle garage or depot and execute a calibration operation during parking into the garage or depot.

Second Embodiment

Figure 11:
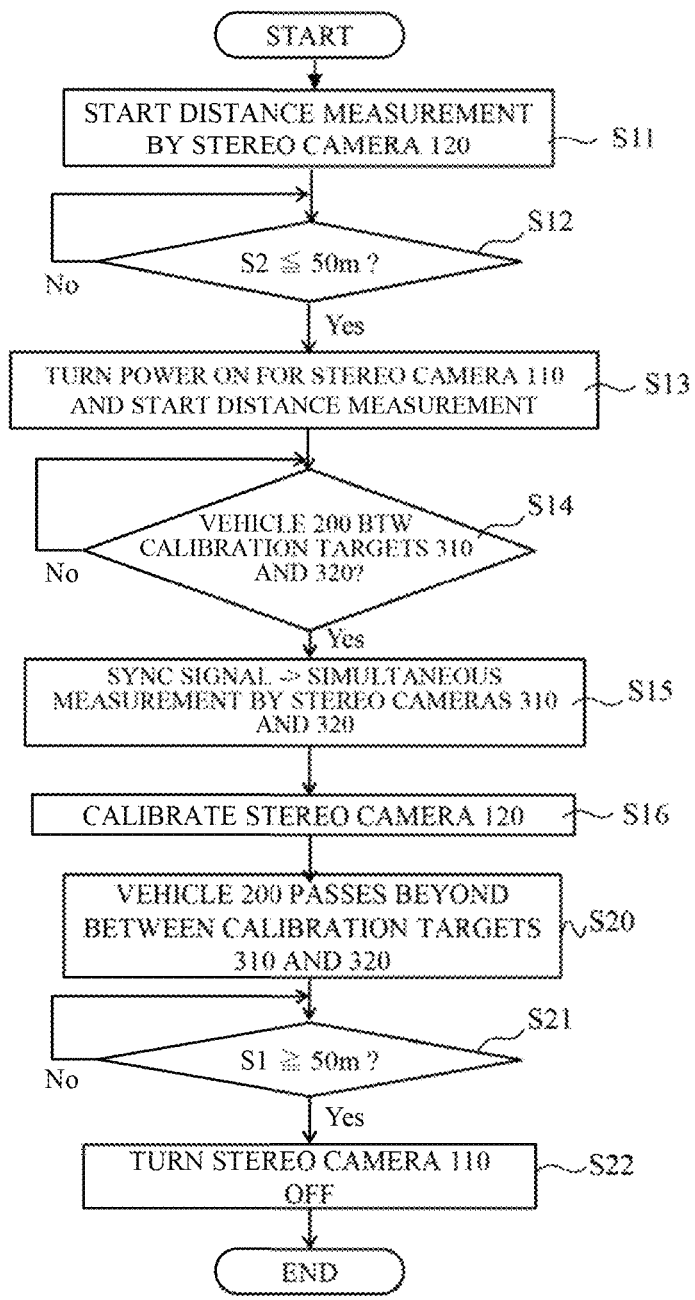
FIG. 11 is a flow chart for describing a procedure for executing a calibration operation in a calibration system according to a second embodiment.

Next, with reference to FIG. 11, description is given for a ranging sensor calibration system according to a second embodiment. The basic structure according to the second embodiment is the same as that according to the first embodiment. However, a calibration operation differs to that according to the first embodiment. FIG. 11 is a flow chart for describing an order for a calibration operation in the calibration system according to the second embodiment.

Figure 10:
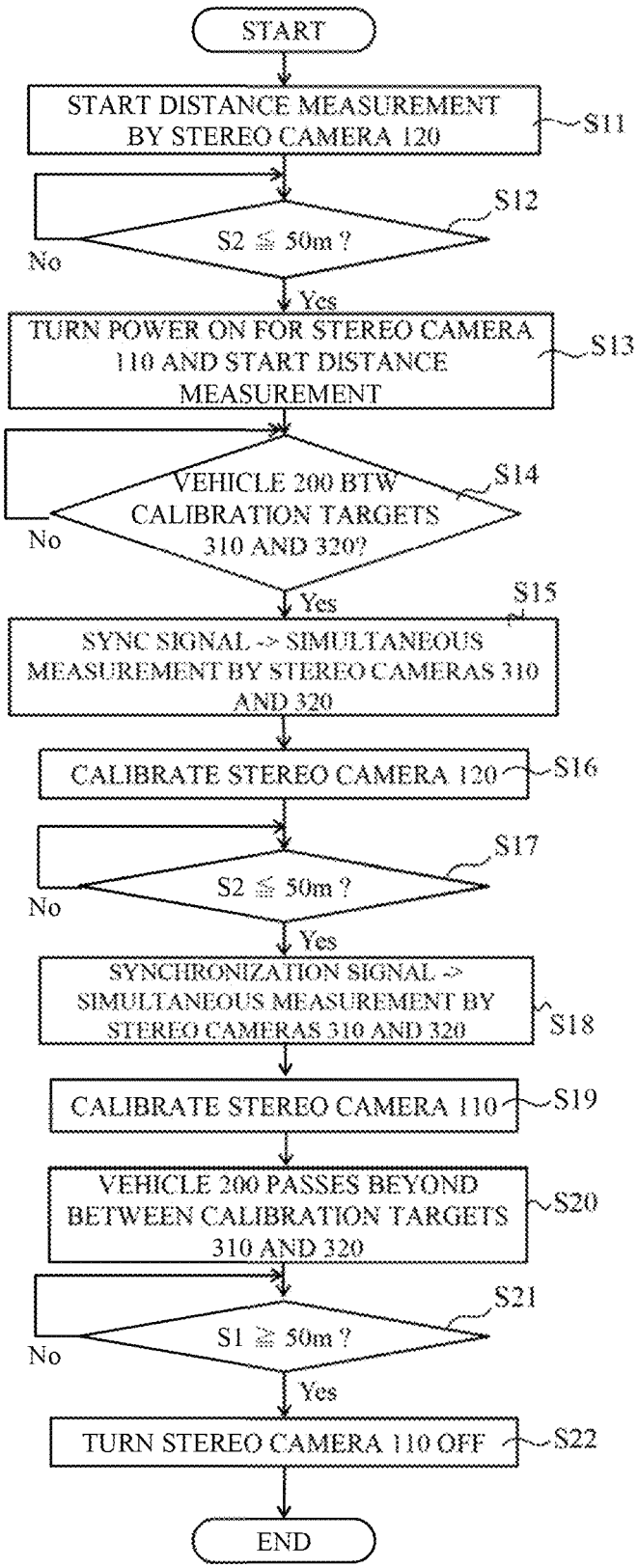
FIG. 10 is a flow chart for describing a procedure for executing a calibration operation in the calibration system according to the first embodiment.

In the first embodiment, firstly calibration of the stereo camera 120 which faces the direction of travel is executed and next calibration of the stereo camera 110 which faces in an opposite direction to the direction of travel is executed, but in the second embodiment, steps S17 to S19 in FIG. 10 are omitted. In other words, only calibration of the stereo camera 120 which is facing the direction of travel is executed, and calibration of the stereo camera 110 which is facing the opposite direction to the direction of travel is omitted. Calibration of the stereo camera 110 can be executed in a case where the direction of travel of the vehicle 200 has changed to the right direction.

Third Embodiment

Figure 12:
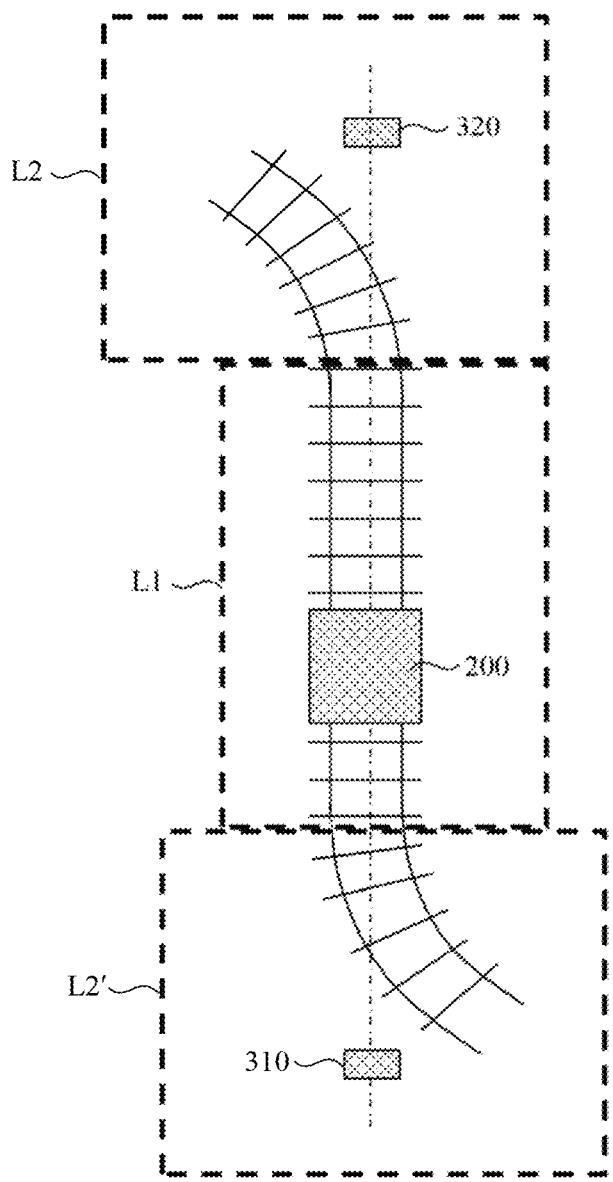
FIG. 12 illustrates an example of dispositions of the calibration targets 310 and 320 in a calibration system according to a third embodiment.

Next, with reference to FIG. 12, description is given for a ranging sensor calibration system according to a third embodiment. The basic structure according to the third embodiment is the same as that according to the first embodiment, and operation is also similar to that described by FIG. 6 through FIG. 9. However, in the third embodiment, the positions at which the calibration targets 310 and 320 are disposed differs to those in the first embodiment.

In the third embodiment, as illustrated in FIG. 12, the calibration targets 310 and 320 are disposed near boundaries between a straight-light portion L1 of track and curved portions L2 and L2', on an approximate extension line from the straight-light portion L1. In FIG. 12, the calibration targets 310 and 320 are both disposed on an approximate extension line from the straight-light portion L1. Instead of this, it is possible to dispose one of the calibration targets 310 and 320 at a position on the straight-light portion L1. In other words, it is possible to dispose at least one of the calibration targets 310 and 320 on an approximate extension line of the straight-light portion L1.

It is desirable for the calibration targets 310 and 320 to be captured near the center of the image capturing elements in the stereo cameras 110 and 120. This is because the periphery of the lenses 101 and 102 has greater distortion, and a plurality of factors for image deviation are present there. For example, scaling occurs due to temperature characteristics of a lens at the periphery of an image, and deviation in the image position arises due to this. In contrast, deviation of the image position occurring at the image center is considered to be angular deviation by the optical axis. It is desirable to dispose the calibration targets 310 and 320 at positions as in FIG. 12 in order to cause image formation for the calibration targets 310 and 320 to be near the center of the image capturing elements. Alternatively, it is desirable to select an existing structure as a calibration target under the same conditions.

(Concrete Example of Calibration Target)

With reference to FIG. 13 through FIG. 17, concrete examples of the calibration targets 310 and 320 are described.

Figure 13:
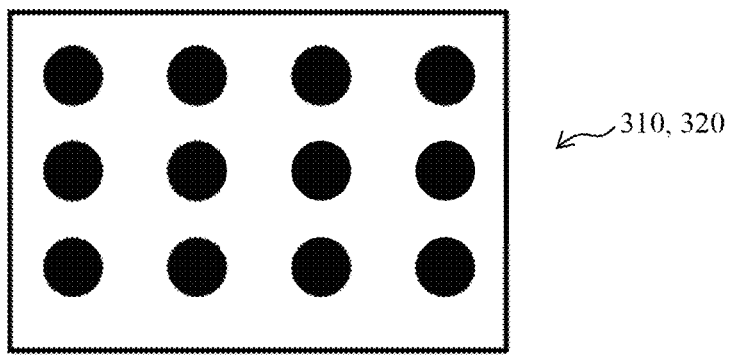
FIG. 13 illustrates one concrete example of a calibration target.

FIG. 13 is a first concrete example of the calibration targets 310 and 320. It is desirable for the calibration targets 310 and 320 to have an appropriately high spatial frequency in order to enable stable ranging by the stereo cameras 110 and 120. From this perspective, the calibration targets 310 and 320 according to the first concrete example in FIG. 13 have a plurality of circular marks that are disposed equidistantly as black circles on a white background.

Figure 14:
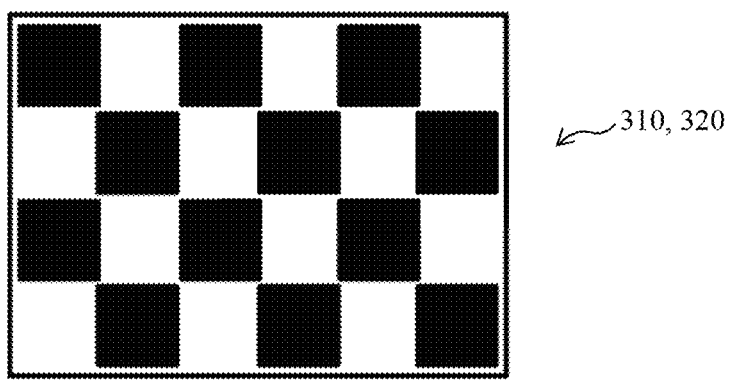
FIG. 14 illustrates one concrete example of a calibration target.
Figure 15:
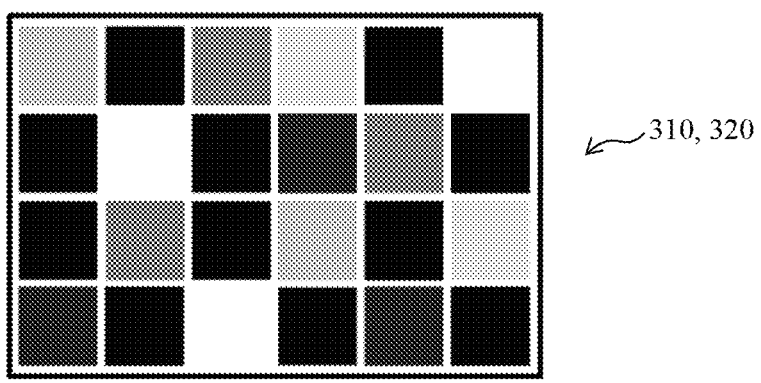
FIG. 15 illustrates one concrete example of a calibration target.

FIG. 14 is a second concrete example of the calibration targets 310 and 320 in which black rectangular marks are disposed such that a so-called checkered pattern is formed. FIG. 15 is a third concrete example of the calibration targets 310 and 320 and has a mosaic pattern in which black rectangular marks, gray rectangular marks, and white rectangular marks are arranged in a matrix shape.

Figure 16:
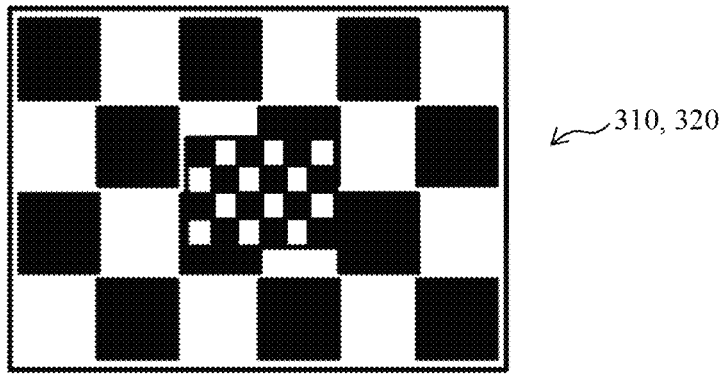
FIG. 16 illustrates one concrete example of a calibration target.
Figure 17:
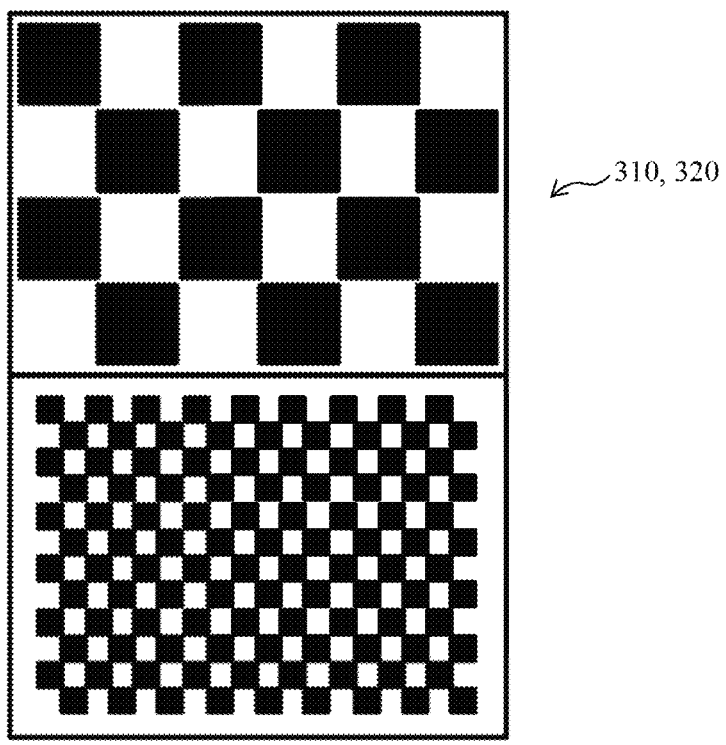
FIG. 17 illustrates one concrete example of a calibration target.

FIG. 16 is a fourth concrete example of the calibration targets 310 and 320, and has a large pattern for which the spatial frequency is low and a small pattern for which the spatial frequency is high in a shape where the patterns are overlapped. The illustrated example includes patterns with two types of different spatial frequencies, but this is an example, and a pattern with three or more types of spatial frequencies may be included. FIG. 17 is a fifth concrete example of the calibration targets 310 and 320, and has a large pattern for which the spatial frequency is low and a small pattern for which the spatial frequency is high in a shape where the patterns are divided into different regions (top and bottom).

(Variations)

Description is given for embodiments of the invention above, but the present invention is not limited to these embodiments. For example, in the embodiments described above, detection results from a plurality of stereo cameras (ranging sensors) disposed at the front and rear of the vehicle 200 are used to execute a calibration operation, but it goes without saying that a fusion sensor to which is mounted a separate ranging sensor, for example a high accuracy ranging sensor as with LIDAR, may be separately provided in addition to these stereo cameras. In this case, it is possible to perform calibration even if there are respectively different ranging ranges between a sensor to be calibrated and a sensor used for calibration, and equivalent effects can be obtained.

In addition, in the embodiments described above, in order to calibrate one stereo camera, ranging information from another stereo camera (that faces the opposite direction) is used, but the present invention is not limited to this. For example, it is possible to use GPS (Global Positioning System) or ATS (Automatic Train Stop) to detect the position of the vehicle 200 and the position of a calibration target, calculate the distance between a self position and the calibration target, and make this be a correct answer value. In addition, if measurement error for GPS or ATS increases due to high-speed travel by the vehicle 200, it is possible to perform measurement when stopped or during low-speed travel and acquire a correct answer value. If detection accuracy for the correct answer value is equivalent to that for the stereo camera 110, equivalent accuracy is also achieved for a calibration result.

The present invention is no limited to the embodiments described above, and includes various variations. For example, the embodiments described above are described in detail in order to describe the present invention in a way that is easy to understand, and there is not necessarily a limitation to something provided with all of the configurations described. In addition, it is possible to replace a portion of the configuration of one embodiment with the configuration of another embodiment, and it is also possible to add, to the configuration of one embodiment, the configuration of another embodiment. In addition, it is possible to perform an addition, deletion, or replacement of another configuration to a portion of the configuration of each embodiment.

REFERENCE SIGNS LIST

11: Calibration system
12: CPU
13: FPGA
14: ROM
15: RAM
16: Communication control unit
17: Display control unit
101, 102: Lens
103, 104: Image capturing element
110, 120: Stereo camera
200: Vehicle
310, 320: Calibration target

The invention claimed is:
1. A ranging sensor calibration system comprising:
a plurality of ranging sensors that are installed facing at least a first direction along a direction of travel of a vehicle and a second direction that is an opposite direction to the first direction, and are configured to be able to measure a distance;

two calibration targets disposed near a travel path for the vehicle; and a calibration processing unit that configures the plurality of ranging sensors, wherein the calibration processing unit is configured to:
transmit a synchronization signal to the plurality of ranging sensors, and based on the synchronization signal, each of the plurality of ranging sensors is controlled by the calibration processing unit to obtain an image of one of the two calibration targets and to measure a distance to the one of the two calibration targets, and calibrate the plurality of ranging sensors on a basis of a distance between the two calibration targets, a distance between two of the plurality of ranging sensors, and the distance measured by each of the plurality of ranging sensors; and wherein letting the distance between the two calibration targets be Lt, the distance between the plurality of ranging sensors be Ls, a ranging result by a first ranging sensor from among the plurality of ranging sensors be S1, a ranging result by a second ranging sensor from among the plurality of ranging sensors be S2, and an error be Δ, the calibration processing unit calculates the error Δ using Δ=S2−(Lt−Ls−S1).

2. The ranging sensor calibration system according to claim 1, wherein
ranging results by the plurality of ranging sensors are obtained at approximately same time.

3. The ranging sensor calibration system according to claim 1, wherein
the calibration processing unit, on a basis of a measurement result by a ranging sensor for which a distance to the one of the two calibration targets is a first distance from among the plurality of ranging sensors, executes calibration of a ranging sensor for which a distance to the one of the two calibration targets is a second distance that is longer than the first distance from among the plurality of ranging sensors.

4. The ranging sensor calibration system according to claim 1, wherein
the plurality of ranging sensors are stereo cameras.

5. The ranging sensor calibration system according to claim 1, wherein
the calibration processing unit is configured to, while the vehicle is traveling between the two calibration targets, calibrate, from among the plurality of ranging sensors, a first ranging sensor that is facing the first direction on a basis of a ranging result by a second ranging sensor that is facing the second direction and next calibrate the second ranging sensor on a basis of a ranging result by the first ranging sensor.

6. The ranging sensor calibration system according to claim 5, wherein
the second ranging sensor from among the plurality of ranging sensors is configured such that, in a case where the vehicle is positioned near the one of the two calibration targets, a power supply is turned on or a ranging operation starts.

7. The ranging sensor calibration system according to claim 1, wherein
the two calibration targets are set on a straight portion from among travel paths for the vehicle.

8. The ranging sensor calibration system according to claim 1, wherein
at least one of the two calibration targets is positioned near a boundary between a straight portion and a curved portion from among travel paths for the vehicle, on an approximate extension line from the straight portion.

9. The ranging sensor calibration system according to claim 1, wherein
the calibration processing unit executes calibration processing using measurement results by the plurality of ranging sensors that are achieved by employing, as the two calibration targets, existing equipment that includes a utility pole or targets generated by working the existing equipment.

10. A ranging sensor calibration system comprising:
a plurality of ranging sensors that are installed facing at least a first direction along a direction of travel of a vehicle and a second direction that is an opposite direction to the first direction, and are configured to be able to measure a distance;

two calibration targets disposed near a travel path for the vehicle; and a calibration processing unit that configures the plurality of ranging sensors;

wherein the calibration processing unit is configured to:
transmit a synchronization signal to the plurality of ranging sensors, and based on the synchronization signal, each of the plurality of ranging sensors is controlled by the calibration processing unit to obtain an image of one of the two calibration targets and to measure a distance to the one of the two calibration targets, and calibrate the plurality of ranging sensors on a basis of a distance between the two calibration targets, a distance between two of the plurality of ranging sensors, and the distance measured by each of the plurality of ranging sensors;

wherein letting the distance between the two calibration targets be Lt, the distance between the plurality of ranging sensors be Ls, a shortest measurable distance by a first ranging sensor from among the plurality of ranging sensors be R1min, a longest measurable distance by the first ranging sensor be R1max, a shortest measurable distance by a second ranging sensor from among the plurality of ranging sensors be R2min, and a longest measurable distance by the second ranging sensor be R2max, Lt is set such that $$Ls+R1\,min+R2\,min<Lt<Ls+R1max+R2max$$

is satisfied.

11. A ranging sensor calibration system comprising:
a plurality of ranging sensors that are installed facing at least a first direction along a direction of travel of a vehicle and a second direction that is an opposite direction to the first direction, and are configured to be able to measure a distance;

two calibration targets disposed near a travel path for the vehicle; and a calibration processing unit that configures the plurality of ranging sensors;

wherein the calibration processing unit is configured to:
transmit a synchronization signal to the plurality of ranging sensors, and based on the synchronization signal, each of the plurality of ranging sensors is controlled by the calibration processing unit to obtain an image of one of the two calibration targets and to measure a distance to the one of the two calibration targets, and calibrate the plurality of ranging sensors on a basis of a distance between the two calibration targets, a distance between two of the plurality of ranging sensors, and the distance measured by each of the plurality of ranging sensors;

wherein in a case where the distance between the two calibration targets is Lt, the distance between the plurality of ranging sensors is Ls, ranges in which the plurality of ranging sensors can perform ranging are mutually same, a shortest measurable distance is Rmin, and a longest measurable distance is Rmax, Lt is set such that $$Lt \approx Ls + R\max + R\min$$

is satisfied.

12. A ranging sensor calibration method comprising:

installing a plurality of ranging sensors facing at least a first direction along a direction of travel of a vehicle and a second direction that is an opposite direction to the first direction, and installing two calibration targets near a travel path for the vehicle;

transmitting a synchronization signal to the plurality of ranging sensors;

based on the synchronization signal, controlling each of the plurality of ranging sensors to obtain an image of one of the two calibration targets and to measure a distance to the one of the two calibration targets; and performing calibration of the plurality of ranging sensors on a basis of a distance between the two calibration targets, a distance between two of the plurality of ranging sensors, and the distance measured by each of the plurality of ranging sensors;

wherein letting the distance between the two calibration targets be Lt, the distance between the plurality of ranging sensors be Ls, a ranging result by a first ranging sensor from among the plurality of ranging sensors be S1, a ranging result by a second ranging sensor from among the plurality of ranging sensors be S2, and an error be $\Delta$, the error $\Delta$ is calculated using $\Delta = S2 - (Lt - Ls - S1)$.

13. The ranging sensor calibration method according to claim 12, wherein ranging results by the plurality of ranging sensors are obtained at approximately same time.

14. The ranging sensor calibration method according to claim 12, wherein, on a basis of a measurement result by a ranging sensor for which a distance to the one of the two calibration targets is a first distance from among the plurality of ranging sensors, calibration is executed for a ranging sensor for which a distance to the one of the two calibration targets is a second distance that is longer than the first distance from among the plurality of ranging sensors.

15. The ranging sensor calibration method according to claim 12, wherein, while the vehicle is traveling between the two calibration targets, calibration for, from among the plurality of ranging sensors, a first ranging sensor that is facing the first direction is performed on a basis of a ranging result by a second ranging sensor that is facing the second direction and next calibration for the second ranging sensor is performed on a basis of a ranging result by the first ranging sensor.

\* \* \* \* \*